United States Patent [19]

Van Veen et al.

[11] Patent Number: 4,544,361
[45] Date of Patent: Oct. 1, 1985

[54] ARTIFICIAL ANIMAL JAW

[75] Inventors: Onno Van Veen, Aurora; Dale B. Knobloch, Conifer, both of Colo.

[73] Assignee: Jonas Brothers, Inc., Denver, Colo.

[21] Appl. No.: 641,853

[22] Filed: Aug. 16, 1984

[51] Int. Cl.⁴ .............................................. G09B 23/36
[52] U.S. Cl. ..................................................... 434/296
[58] Field of Search ................................ 434/295, 296

[56] References Cited

U.S. PATENT DOCUMENTS

| | | | |
|---|---|---|---|
| 1,667,205 | 4/1928 | Ingwersen | 434/296 |
| 2,306,464 | 12/1942 | Nowothy | 434/296 |
| 4,359,320 | 11/1982 | Thomas | 434/296 |

Primary Examiner—Harland S. Skogquist
Attorney, Agent, or Firm—John E. Reilly

[57] ABSTRACT

An artificial jaw set having separate upper and lower jaw members includes a simulated palate with integrated teeth and tissue portions along the front and opposite side edges. The rear part of the upper palate opposite the front edge curves downwardly toward the lower jaw member to end in a reverse curved rear edge. The rear portion of the lower palate is also curved slightly downwardly and terminates in a reverse curved rear edge. The upper and lower jaw members are joined by means pivotally interconnecting the members for movement toward and away from each other.

11 Claims, 5 Drawing Figures

ARTIFICIAL ANIMAL JAW

This invention relates to the art of taxidermy, and more particularly relates to a novel and improved taxidermy jaw form which is conformable for use in simulating the jaws and mouths of various animals.

BACKGROUND AND FIELD OF THE INVENTION

In prior approaches to the formation of artificial animal jaws for use in taxidermy forms, it has been customary to design the jaw either in an open or closed mouth position. In either case, the upper and lower jaws are substantially fixed with respect to each other. This is not a significant disadvantage when a closed mouth position is desired; however, when an open mouth arrangement is preferred, the taxidermist often alters the standard head shell to provide the most pleasing result for the particular hide to be mounted. The degree of jaw opening, however, is limited to that provided in the standard manufactured jaw sets. In order to adjust the jaws to a different angle, the taxidermist must sever the upper and lower jaws, cut away or add portions to achieve the desired angle and hold the jaws in the correct position while applying glue or other bonding agent to maintain the selected angle for insertion into the head shell. Needless to say, this is time-consuming and frequently does not yield accurate and attractive results.

Representative of prior art approaches are U.S. Pat. Nos. 2,306,464 to M. Nowotny; 1,667,205 to G. F. Ingwersen; and 4,359,320 to D. E. Thomas. In the early Ingwersen patent, the upper and lower jaw members are immovably fixed together in an open position. The Nowotny patent discloses a set of artificial jaws in which the rear portions of the upper and lower jaws are formed with facing ribs which support the jaws in an open position, and rearwardly extending shoulders serve to anchor the jaws in the head shell. The jaws are inserted separately into the shell so that the ribs are in alignment, and the jaws are then bonded or otherwise fastened in place. The recent Thomas patent discloses a jaw set for a snake mount wherein the upper and lower jaws are formed with cooperating mating surfaces. The upper and lower jaws can be shaped in the manufacturing process so as to interlock at a particular opening angle, but are not capable of adjustment thereafter.

Another typical approach is to connect the upper and lower jaw members by means of a living hinge, which permits a certain range of independent movement of the jaws with respect to each other. This does not obviate the problem of adjusting the jaw members to a desired opening angle, as the jaws have a tendency to spring back to their original position as they are inserted into the mouth of the head shell.

SUMMARY OF THE INVENTION

It is therefore a principal object of the present invention to provide for a novel and improved artificial animal jaw set wherein the angled relation of the upper and lower jaw members can be adjusted to different angles of opening so as to permit greater latitude in taxidermy design and technique.

Another object of the present invention is to provide for a novel and improved artificial jaw set which can be placed in the mouth opening of a taxidermy shell and adjusted to the desired opening position and which will retain the selected position as it is withdrawn from the shell to prepare the jaw set for permanent bonding to the shell.

It is a further object of the present invention to provide for a novel and improved artificial jaw set wherein separate upper and lower jaw members are interconnected by a hinge means which permits the jaw members to be pivoted to different angles with respect to each other and releasably retained at the selected angle for mounting in a taxidermy shell.

It is an additional object of the present invention to provide for a novel and improved adjustable artificial animal jaw set which is durable and simple to manufacture.

A still further object of the present invention is to provide for an artificial jaw set which is adapted to receive an artificial tongue member in the lower jaw member thereof and which includes means for locating the tongue in the proper position within the jaw set.

In accordance with the foregoing objects, the artificial jaw set of the present invention comprises separate upper and lower jaw members each including a simulated palate with integrated teeth and tissue portions provided along the front and opposite side edges thereof. On the upper palate, the rear portion opposite the front edge curves downwardly toward the lower jaw member to terminate in a reverse curved rear edge. The rear portion of the lower palate is also curved slightly downwardly and terminates in a reverse curved rear edge. The upper and lower jaw members are joined by means pivotally interconnecting the members for movement toward and away from each other. More particularly, projecting locator means are arranged in spaced horizontal relation along the rear edge of one of the upper or lower jaw members and project in a direction toward the other jaw member for snap-fitting insertion into corresponding longitudinally elongated slots in the other jaw member. The locator means are normally frictionally retained within the elongated slots but are longitudinally and rotationally slidable to a selected position within the slots in response to the application of positive pressure in pivoting the jaw members with respect to each other.

When the jaw members are arranged in the desired position, pressure is released. The locator means can then be fixed in place within the slots by the application of adhesive or the like, followed by insertion and mounting of the jaw set within a taxidermy shell.

Other objects, advantages and features of the present invention will become more readily appreciated and understood when taken together with the following detailed description of a preferred embodiment in conjunction with the accompanying drawings, in which:

DETAILED DESCRIPTION OF THE PREFERRED EMBODIMENT

Figure 1:
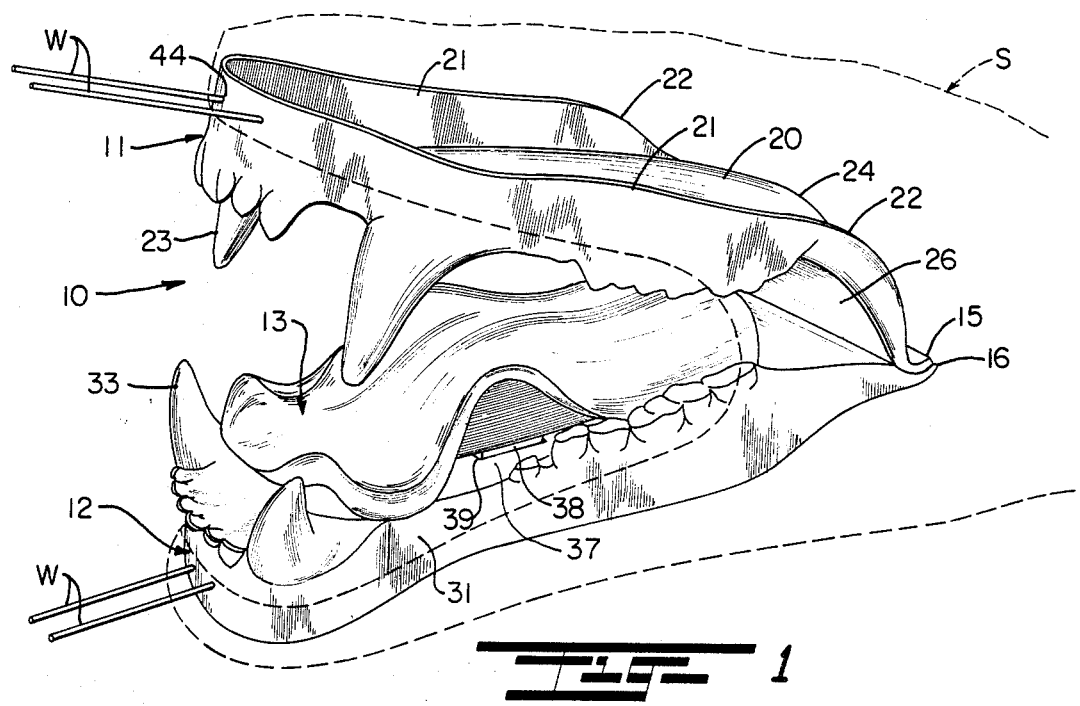
FIG. 1 is a perspective view of the artificial animal jaw set of the present invention positioned in a taxidermy shell and illustrated with a simulated tongue insert.
Figure 2:
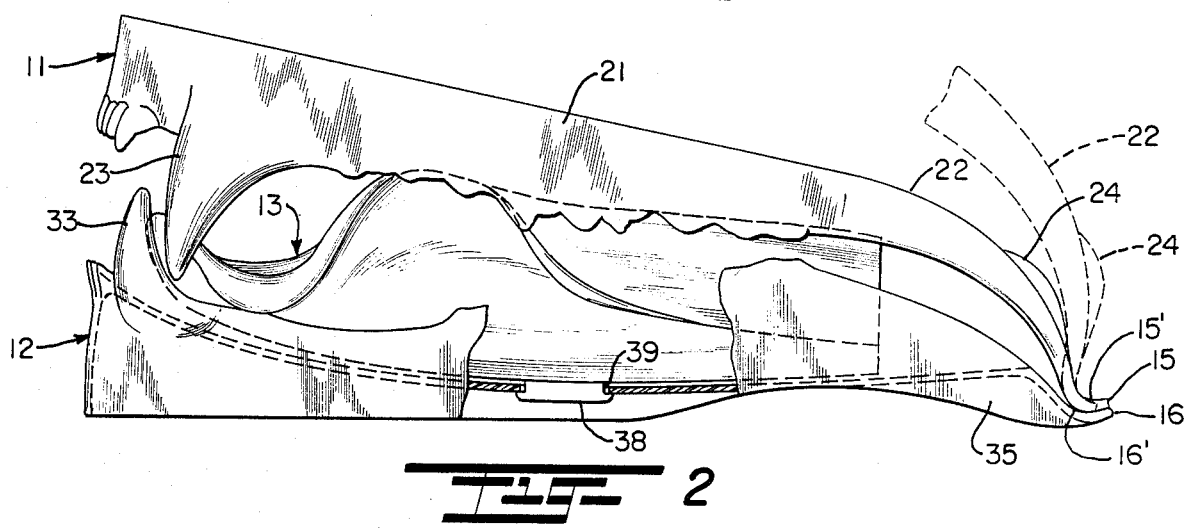
FIG. 2 is a view in elevation of the artificial animal jaw set of FIG. 1 illustrating the adjustability of the upper jaw member to a selected opening angle as shown in dotted line.

FIG. 1 illustrates an artificial jaw set 10 which essentially comprises an upper jaw member 11, lower jaw member 12 and tongue insert 13. The upper and lower jaw members are preferably molded from a relatively rigid plastic material while the tongue is preferably molded of a softer somewhat flexible plastic or other suitable material. The upper and lower jaw members 11 and 12 are formed separately and are interconnected at their respective rear edges 15, 16 in a manner to be described in greater detail hereinbelow.

The upper jaw member 11 comprises a palate portion 20 which is provided along its front and side edges with a peripheral rib forming an upstanding gum portion 21. The gum portion 21 is tapered toward the palate portion 20 near the rear edge 15 of the jaw member 11. Simulated animal teeth generally designated at 23 project downwardly away from the gum portion 21 and may be formed and arranged in any manner suitable to the subject species. The rearmost portion of the palate 20 is slightly curved in the direction of the lower jaw member 12 to simulate the throat portion 24. The palate 20 terminates in a reverse curved portion 15' adjacent the rear edge 15. The upper palate is also curved longitudinally, the side edges being curved slightly in a downward direction away from the center of the palate 20 so that the underside 26 of the palate 20 is somewhat concave. The underside 26 can also be provided with a ridged surface for greater anatomical accuracy.

The lower jaw member 12 is similar in construction to the upper jaw member 11 comprising a somewhat longitudinally concave lower palate 30 having gum portions 31 projecting downwardly away from the front and side edges thereof, and teeth 33 projecting upwardly from the front and side edges toward the upper jaw member 11. The rear portion of the lower palate 30 is first curved downwardly away from the upper jaw member 11 as at 35, then terminates in a reverse or upwardly curved portion 16' adjacent the transverse rear edge 16. The upper surface 37 of the lower palate is slightly concave so that the tongue portion 13 can be inserted therein. The underside of the tongue is provided with a projecting rib 38 which is insertable into a corresponding elongated slot 39 in the lower palate 30.

A particular advantage of the present invention resides in the provision of novel and improved means 40 for interconnecting the upper and lower jaw members 11, 12 which permit the jaw sets 10 to be opened to a desired opening angle and which will maintain the jaw members 11, 12 at the selected angle until the jaw set 10 can be installed and permanently bonded within the mouth of the prepared taxidermy shell.

Figure 3:
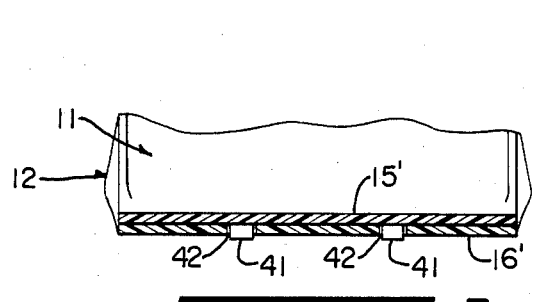
FIG. 3 is a fragmentary vertical cross-sectional view taken adjacent the rear terminal edges of the jaw members at their points of interconnection.
Figure 4:
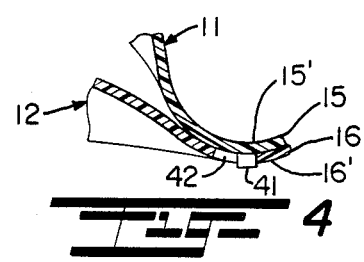
FIG. 4 is a fragmentary longitudinal cross-sectional view of the rear interconnected portions of the jaw members, the jaw members being adjusted to a relatively smaller opening angle.
Figure 5:
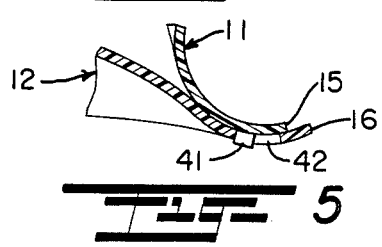
FIG. 5 is a fragmentary longitudinal cross-sectional view of the rear interconnected portions of the jaw members wherein the jaw members are pivoted to produce a relatively greater opening angle than in FIG. 4.

Referring to FIGS. 3 to 5, it will be seen that one of the jaw members, shown here as upper jaw member 12 for illustration, is provided with a pair of locator pins 41 disposed in spaced horizontal relation along the underside of the reverse curved portion 15' immediately adjacent the rear edge 15. The pins are sized for insertion into snap-fitting relation within corresponding spaced elongated apertures 42 located in the reverse curved portion 16' of the lower jaw member adjacent the rear edge 16. Thus, when the locator pins 41 are so inserted, the upper reverse curved portion 15' rests against the lower reverse curved portion 16'. The snap-fitting arrangement establishes a sufficient degree of frictional engagement between the pins 41 and the slots 42 that the pins 41 do not slide freely within the slots 42 but are normally retained in a selected position according to the desired opening angle to which the jaw members 11, 12 are pivoted. For example, as illustrated in FIG. 4, the locator pins are frictionally retained at the rearmost portion of the elongated slot 42 when the jaw members are adjusted to a relatively smaller angle of opening. Upon application of positive pressure to pivot the jaw members with respect to each other, the frictional engagement of the locator pins 41 within the slots 42 is overcome, and the pins can be caused to slide longitudinally to the forward end of the slot as the jaw members 11, 12 are adjusted to a greater degree of opening as shown in FIG. 5. Moreover, due to the configuration of the nesting reverse-curved portions 15', 16' and the corresponding curvature of the slots 42 in portion 16', the pins 41 are caused to slide along a generally arcuate or rotational path between the forward and rearward ends of slots 42. When the jaw members are finally arranged in the desired position, and the positive pressure is relieved, the frictional engagement of the pins 41 and slots 42 once again takes over to retain the jaw members at the selected position. The jaw members can be permanently fixed in the selected position by applying droplets of glue to the pins 41, and permitting the glue to set, bonding the pins within slots 42.

In taxidermy practice, the upper and lower jaw members 11, 12 are first interconnected by snap-fitting the locator pins within the elongated slots. The jaw set 10 can then be inserted into the taxidermy shell S and adjusted to the desired opening position. Since the frictional engagement of the pins within the slot prevents the pins from shifting or sliding unless positively displaced, the adjusted jaw set 10 can be easily removed from the shell S without disturbing the selected opening angle. The pins can be bonded into a fixed position within the slot by application of glue to the pins. Aligned holes 44 are then drilled in the gum portions of the jaws and in the shell S for insertion of wires W to anchor the jaws within the shell. The jaw set 10, now fixed at the precise desired open position, can then be reinserted within the taxidermy shell, secured by the wires therein, and finished in accordance with conventional taxidermy methods.

While a preferred form of the present invention have been set forth and described herein, it is to be understood that various modifications and changes may be resorted to without departing from the spirit and scope of the present invention as defined by the appended claims.

We claim:

1. In an artificial jaw set for use in taxidermy forms wherein upper and lower jaw members include simulated palate portions, integrated teeth and gum portions provided along the front and side edges of each said palate portion and rear edges opposite said front edges on said upper and lower palate portions disposed in complementary relation to one another, the improvement comprising:

hinge means pivotally interconnecting said upper and lower jaw members for movement toward and away from each other, comprising locator means disposed on one of said rear edges and projecting in a direction toward the other of said jaw members for snap-fitting insertion into corresponding slot means disposed adjacent the other of said rear edges of said other jaw member, said locator means being frictionally retained at a selected position within said slot means and movable through said slot means to a selected position in response to the application of positive pressure to said upper and lower jaw members.

2. In an artificial jaw set according to claim 1, said locator means defined by at least one pin member projecting from said one rear edge for insertion into said slot means.

3. In an artificial jaw set according to claim 2, said locator means defined by a pair of pin members disposed in spaced horizontal relation to one another.

4. In an artificial jaw set according to claim 3, said slot means defined by a pair of slots aligned with said pin members.

5. In an artificial jaw set according to claim 4, said pair of slots being elongated, and said pin members being rotationally and longitudinally slidable to different selected positions within said slots whereby to regulate the opening size between said upper and lower jaw members.

6. In an artificial jaw set according to claim 1, including bonding means to bond said locator means within said slot means whereby to fix the opening size between said upper and lower jaw members.

7. In an artificial jaw set according to claim 1, including a tongue insert having a downwardly projecting rib insertable into a slot in said lower palate.

8. An artificial jaw set for use in taxidermy forms, comprising:
   upper and lower jaw members each comprising simulated palate portions, integrated teeth and gum portions provided along the front and side edges of each said palate portion and rear edges opposite said front edges, a rearmost portion of said upper palate portion curving downwardly toward said lower jaw member to terminate in a reverse-curved upper rear edge, and the rearmost portion of said lower palate portion curving downwardly away from said upper jaw member to terminate in a reverse-curved lower rear edge; and
   means pivotally interconnecting said upper and lower jaw members for movement toward and away from each other comprising locator means disposed in spaced horizontal relation along said rear edge of said upper palate and projecting in a direction toward the other of said jaw members for snap-fitting insertion into corresponding longitudinally elongated slots disposed adjacent the rear edge of said other jaw member, said locator means being normally frictionally retained at a selected position within said slots, and longitudinally slidable to a different selected position in response to the application of positive pressure to said upper and lower jaw members.

9. An artificial jaw set according to claim 8, including bonding means for fixing said locator means in said slot to regulate the opening size between said upper and lower jaw members.

10. An artificial jaw set according to claim 8, including a tongue insert having a downwardly projecting rib insertable into snap-fitting engagement within a slot in said lower palate member forwardly of said rear edge.

11. An artificial jaw set according to claim 8, said rear edges defining nested, reverse-curved complementary portions, said locator means cooperating with said rear edges in maintaining a predetermined opening size between said jaw members.

* * * * *